United States Patent
Gross et al.

(10) Patent No.: US 7,191,096 B1
(45) Date of Patent: Mar. 13, 2007

(54) MULTI-DIMENSIONAL SEQUENTIAL PROBABILITY RATIO TEST FOR DETECTING FAILURE CONDITIONS IN COMPUTER SYSTEMS

(75) Inventors: Kenny C. Gross, San Diego, CA (US); Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 36 days.

(21) Appl. No.: 10/918,129

(22) Filed: Aug. 13, 2004

(51) Int. Cl.
*G06F 11/30* (2006.01)

(52) U.S. Cl. ...................... 702/182; 702/179

(58) Field of Classification Search ............ 702/58, 702/59, 66, 67, 68, 69, 70, 71, 90, 91, 111, 702/113, 179, 181, 182, 183, 185–188, 26; 714/26, 157; 376/157
See application file for complete search history.

(56) References Cited

U.S. PATENT DOCUMENTS

| | | | | |
|---|---|---|---|---|
| 4,937,763 A | | 6/1990 | Mott ............... | 702/183 |
| 5,059,127 A | * | 10/1991 | Lewis et al. .......... | 434/353 |
| 5,987,399 A | * | 11/1999 | Wegerich et al. ...... | 702/183 |
| 6,240,372 B1 | * | 5/2001 | Gross et al. ........... | 702/71 |
| 6,839,655 B2 | * | 1/2005 | Gross et al. ........... | 702/179 |
| 2002/0091499 A1 | * | 7/2002 | Wegerich et al. ...... | 702/182 |
| 2003/0220767 A1 | * | 11/2003 | Wegerich ............... | 702/182 |

* cited by examiner

*Primary Examiner*—Marc S. Hoff
*Assistant Examiner*—Mohamed Charioui
(74) *Attorney, Agent, or Firm*—Park, Vaughan & Fleming, LLP

(57) ABSTRACT

One embodiment of the present invention provides a monitoring system that detects anomalies in data gathered from sensors in a computer system. During operation, the monitoring system samples data from a plurality of sensors located at various sampling points throughout the computer system. Next, the monitoring system interpolates the data from the sampling points to produce a real-time digitized surface. The monitoring system then subtracts a reference digitized surface from the real-time digitized surface to produce a residual digitized surface. Finally, the monitoring system applies a multi-dimensional sequential probability ratio test (SPRT) to the residual digitized surface to detect anomalies in the residual digitized surface which indicate an impending failure of the computer system.

25 Claims, 3 Drawing Sheets

Reference Surface

Real-Time Surface (With an Anomaly)

Residual Surface

MULTI-DIMENSIONAL SEQUENTIAL PROBABILITY RATIO TEST FOR DETECTING FAILURE CONDITIONS IN COMPUTER SYSTEMS

BACKGROUND

1. Field of the Invention

The present invention relates to techniques for improving the availability of computer systems. More specifically, the present invention relates to a method and an apparatus for improving the availability using a multi-dimensional sequential probability test (SPRT) to proactively detect a failure condition before a resulting failure occurs.

2. Related Art

As information technologies become more prevalent, organizations, such as businesses and governments, are becoming more dependent on enterprise computing systems to process ever-larger volumes of electronic transactions. A failure in an enterprise computing system can be disastrous, potentially resulting in millions of dollars of losses in productivity and business. In addition, a failure can seriously undermine consumer confidence in a business, making customers less likely to purchase goods and services from the business. Hence, it is desirable to detect and correct these failures before they lead to catastrophic system failures.

One of the major causes of computer system failures is variations in operating conditions. During execution, computer systems typically require that operating parameters, such as heat or vibration, stay within a predefined range. If the parameters vary beyond the operating range, system components can fail.

There are many reasons that can cause the operating parameters to vary beyond the safe operating range. For example, a defective power supply, which operates at a high temperature, can cause a part of a system board to overheat beyond the safe operating temperature range. Similarly, a defective fan motor may vibrate excessively, causing the system board to vibrate, which can cause components on the system board to fail. If such anomalies are not detected in a timely fashion, they can result in catastrophic system failures.

To detect such anomalies, computer systems often employ threshold-based monitoring systems. A threshold-based monitoring system monitors various system parameters and determines whether each parameter is operating within a specified range. If the value of a monitored parameter goes out of the range, the threshold-based monitoring system generates a warning.

Unfortunately, threshold-based monitoring systems have many drawbacks. One of the main drawbacks is that the accuracy of a threshold-based monitoring system depends heavily on the accuracy of the transducers used to measure system parameters. Hence, if the transducers are imperfect and return noisy signals, they can cause the threshold-monitoring system to malfunction. Moreover, process variations during the sensor manufacturing process can cause measurement differences between different sensors. These measurement differences can also cause the threshold-monitoring system to malfunction.

A present method to overcome these drawbacks is to set wide thresholds, so that the monitoring system does not generate a large number of false alarms. Unfortunately, when thresholds are set widely, the monitoring system typically detects failure conditions at an advanced stage, by which time it is too later to perform preventive maintenance. Detecting failures at such an advanced stage usually leads to forcibly shutting down the computer system for maintenance purposes, which may result in loss of productivity and business.

Hence, what is needed is a monitoring system that accurately detects system anomalies at an early stage.

SUMMARY

One embodiment of the present invention provides a monitoring system that detects anomalies in data gathered from sensors in a computer system. During operation, the monitoring system samples data from a plurality of sensors located at various sampling points throughout the computer system. Next, the monitoring system interpolates the data from the sampling points to produce a real-time digitized surface. The monitoring system then subtracts a reference digitized surface from the real-time digitized surface to produce a residual digitized surface. Finally, the monitoring system applies a multi-dimensional sequential probability ratio test (SPRT) to the residual digitized surface to detect anomalies in the residual digitized surface which indicate an impending failure of the computer system.

In a variation of this embodiment, performing a multi-dimensional SPRT involves performing a SPRT in the x-direction and in the y-direction.

In a variation of this embodiment, performing the multi-dimensional SPRT involves performing a SPRT in the x-direction, performing a SPRT in the y-direction, and performing a SPRT in the z-direction.

In a variation of this embodiment, performing a SPRT in a specific direction involves performing the SPRT across parallel lines in the specified direction wherein the parallel lines are spaced at regular intervals across the digitized surface.

In a variation of this embodiment, creating the reference digitized surface for the computer system involves sampling a plurality of sensors in a reference computer system and generating an interpolated digitized surface from the sampled data.

In a variation of this embodiment, the sensors can measure parameters such as, heat, vibration, noise, loads or any other numerical parameter within the computer system.

In a variation of this embodiment, if the multi-dimensional SPRT detects an anomaly, the system generates an alarm indicating that the computer system is likely to fail.

In a variation of this embodiment, generating the alarm involves identifying a location for the anomaly within the computer system.

In a variation of this embodiment, interpolating the data from the sampling points involves using a response surface method (RSM) to interpolate the digitized surface between the discrete sampling points.

The present invention has multiple advantages over existing approaches for detecting system anomalies. For example, the present invention can detect anomalies with a higher sensitivity than existing approaches. Hence, the present invention can detect a system anomaly early enough so that preventive steps can be taken well before a catastrophic failure occurs. Moreover, the present invention detects these anomalies without significantly increasing the probability of false alarms.

In the past, SPRT has only been applied to univariate time series data. The present invention applies the SPRT technique to detecting anomalies in spatial data (not time series data), and in particular to multidimensional spatial data. Note that applying the SPRT technique in multiple dimensions can be advantageous, because there can be a subtle disturbance which does not trip a SPRT alarm in one dimension (say the X dimension), but that trips a SPRT alarm in an orthogonal dimension (say the Y dimension). Hence, by applying the SPRT technique to multiple dimensions, the present invention is able to detect subtle anomalies that may not have been detected if the SPRT technique was applied to a single dimension.

DETAILED DESCRIPTION

Figure 1A:
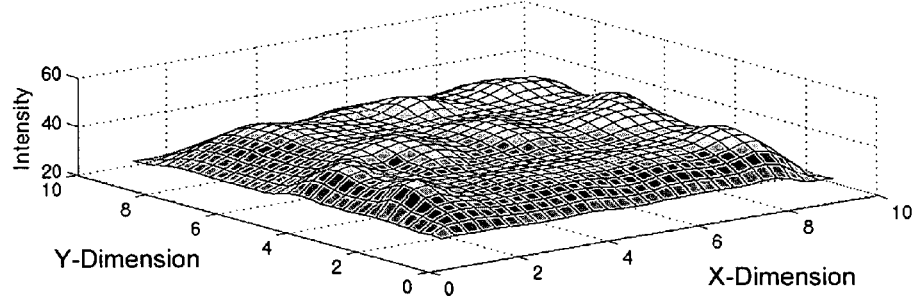
FIG. 1A illustrates a reference surface in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Digitized Surface

A digitized surface digitally represents a distributed set of physical values. Fluctuations in the digitized surface can indicate a variation in the value. For example, if the digitized surface is generated using measurements associated with the performance of a computer system, a difference in altitude in a specific region of the digitized surface can indicate a variance in that measured parameter in a specific location within the computer system. For example, in FIGS. 1A, 1B, 2A, and 2B, the surfaces are generated from a grid of temperature sensors on component boards within a computer system. However, the surface can be generated from measurements of other performance indicators, such as vibration, radiation, sound or any miscellaneous environmental variable.

Furthermore, the surface is not limited to surfaces generated from a collection of computer system performance samples, but can be any digitized surface, such as a digitized grey-scale image.

One embodiment of the present invention employs the response system method (RSM) to generate the digitized surface. The RSM is a well-known technique for assigning a relative altitude to each sampling point in the performance sample and for interpolating the values for the surface between the discrete sampling points. For more information on curve fitting using RSM, see Raymond H. Myers & Douglas Montgomery, *Response Surface Methodology: Process and Product Optimization Using Designed Experiments* 303 (2d ed. 2002).

In addition, one embodiment of the present invention uses a multi-dimensional sequential probability ratio test (SPRT) to analyze the digitized surfaces. The SPRT is a statistical method generally used for analyzing the sequential change in values within a system. The SPRT applies a binary hypothesis to decide if the values are within acceptable limits or if they have degraded. A SPRT catches an anomaly (a possible failure condition) in a system by monitoring trends in system values over time. By monitoring the values over time, the SPRT averages out transient values like noise spikes that might activate an alarm in a more simplistic method of monitoring (such as a method that uses threshold limits). Because the SPRT is not affected by transient signals, tighter effective tolerances can be defined for system monitoring, thereby enabling a system to generate a warning before conditions become as critical as with threshold-based monitoring techniques.

Calculating a Residual Surface under Normal Operating Conditions

FIG. 1A illustrates a reference surface in accordance with an embodiment of the present invention. Before running multi-dimensional SPRT diagnostics on a computer system, a reference surface is generated for the computer system. The reference surface provides a standard against which the real-time operation of the computer system is compared.

The reference surface is interpolated from averages of measurements of the sampled parameters while a computer system is operating normally (without the presence of any anomalies in the measured parameter). The reference surface is static and is used to create the residual surface as is described below, with reference to FIG. 1C.

Figure 1B:
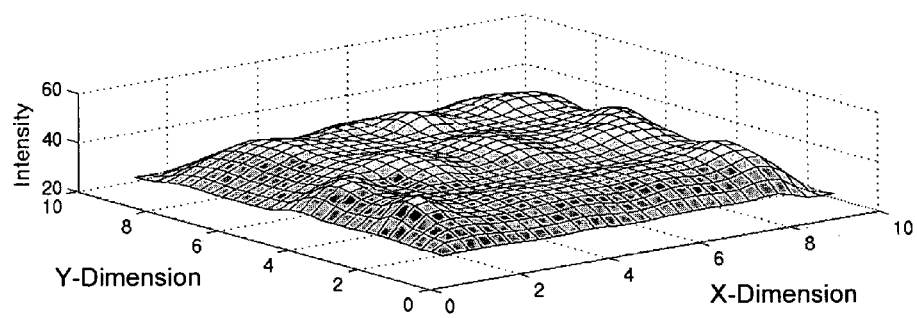
FIG. 1B illustrates a real-time surface without an anomaly in accordance with an embodiment of the present invention.

FIG. 1B illustrates a real-time surface without an anomaly in accordance with an embodiment of the present invention. The real-time surface is generated from data measurements in real-time taken from a computer system operating in a real-world (non-reference) environment. The surface in FIG. 1B corresponds to a computer system operating with all measured temperatures within an allowable variance of the reference system.

Figure 1C:
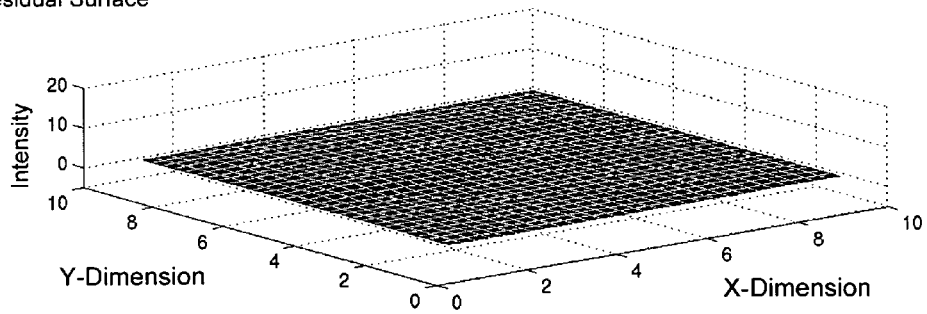
FIG. 1C illustrates a residual surface without an anomaly in accordance with an embodiment of the present invention.

FIG. 1C illustrates a residual surface without an anomaly in accordance with an embodiment of the present invention. This residual surface is created by subtracting the reference surface from the real-time surface. When the computer system is operating normally, values in the residual surface reflect the process and measurement noise at locations on the surface. If the noise levels are relatively small, the residual surface is nearly flat. Note that process and measurement noise are unavoidable byproducts of process and measurement variations.

Calculating a Residual Surface under Error Operating Conditions

Figure 2A:
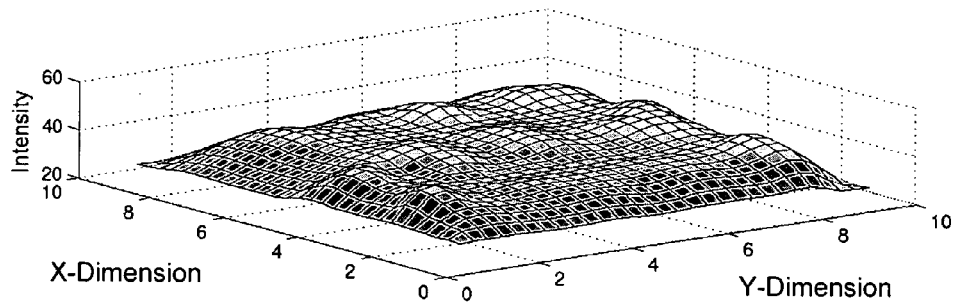
FIG. 2A illustrates a reference surface in accordance with an embodiment of the present invention.

FIG. 2A illustrates a reference surface in accordance with an embodiment of the present invention. This reference surface provides a standard against which the real-time operation of the computer system is compared.

Figure 2B:
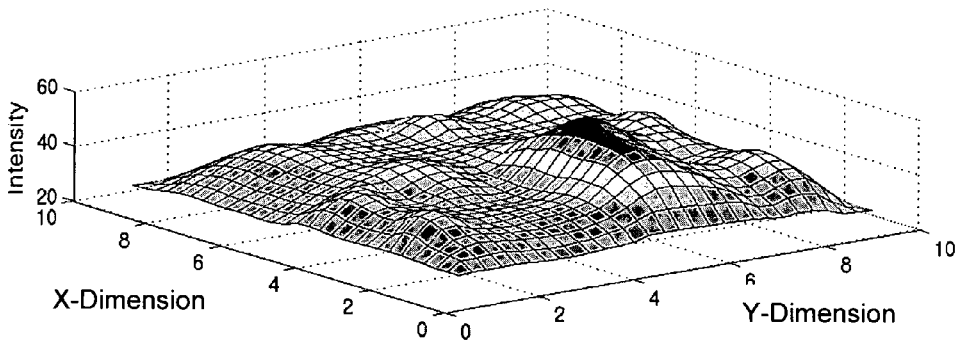
FIG. 2B illustrates a real-time surface with an anomaly in accordance with an embodiment of the present invention.

FIG. 2B illustrates a real-time surface with an anomaly in accordance with an embodiment of the present invention. In FIG. 2B, part of the computer system is operating at an above-normal temperature. When part of the computer system overheats, the temperature increase is manifested by a peak in the real-time digitized surface. In this case, the peak is located near (X, Y)=7, 3 on the real-time digitized surface.

Figure 2C:
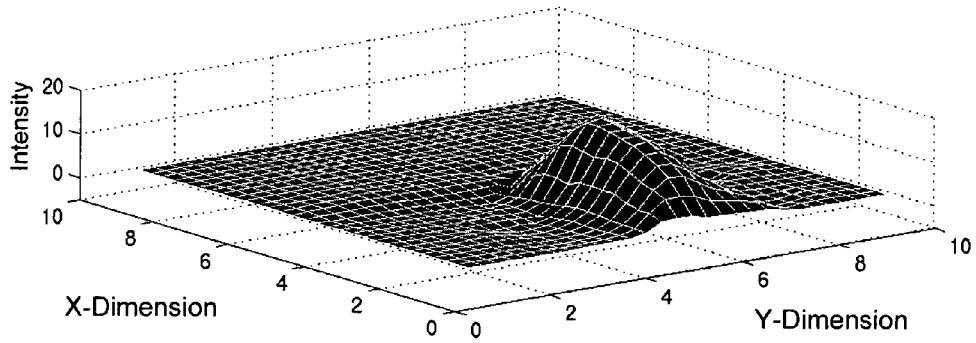
FIG. 2C illustrates a residual surface with an anomaly in accordance with an embodiment of the present invention.

FIG. 2C illustrates a corresponding residual surface with an anomaly in accordance with an embodiment of the present invention. This residual surface is created by subtracting the reference surface from the real-time surface.

Since the real-time surface (see FIG. 2B) has a local peak which is higher than the reference surface (see FIG. 2A) for the same location, there is a peak in the residual surface. The peak in the residual surface is located at 7, 3, which is the same location as the peak in the real-time surface. The residual surface indicates a computer system that is operating normally aside from the peak at 7, 3.

Monitoring System Parameters Using a Multi-Dimensional SPRT

Figure 3:
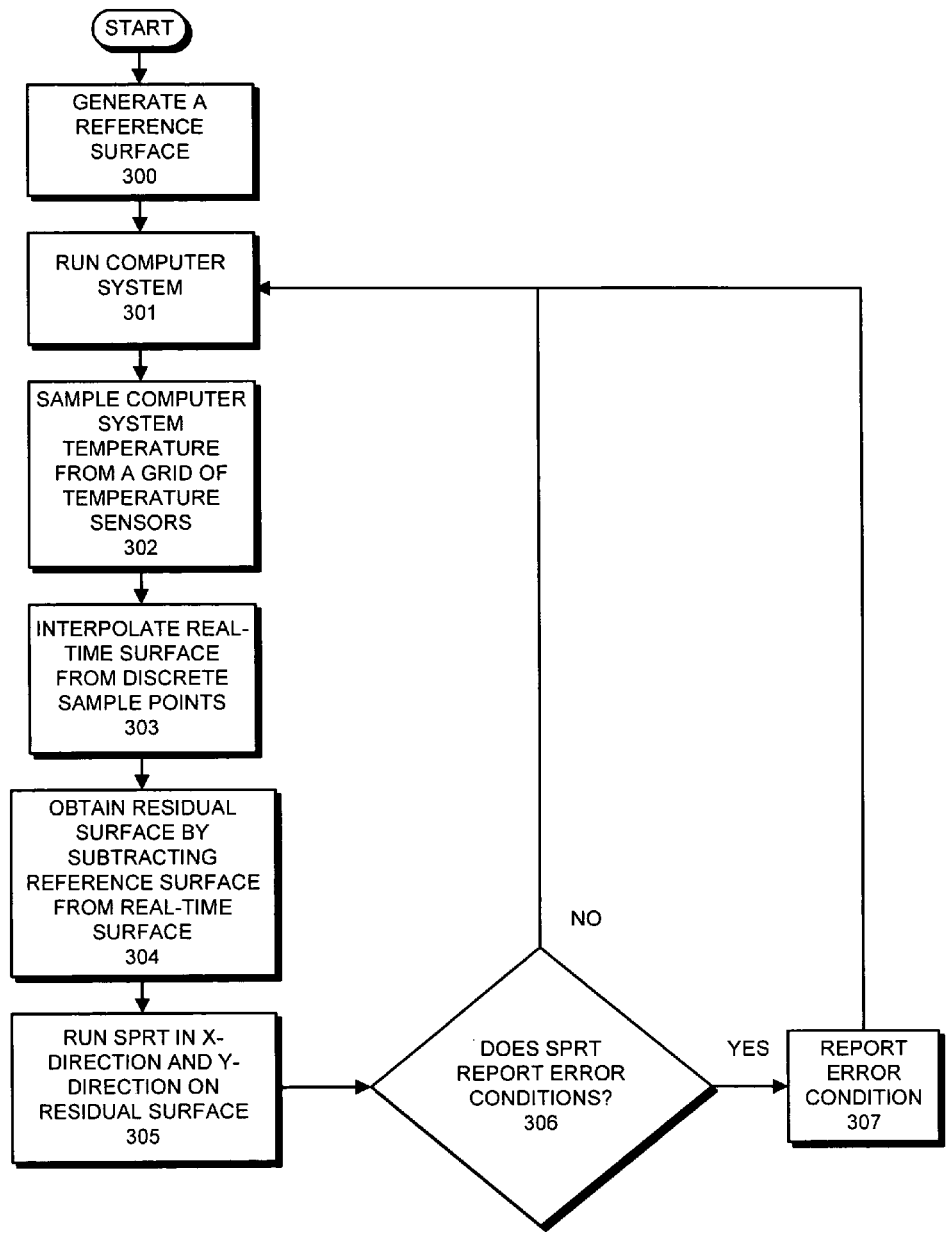
FIG. 3 presents a flow chart illustrating the process of running a multi-dimensional SPRT on a digitized surface in accordance with an embodiment of the present invention.

FIG. 3 presents a flow chart illustrating the process of running a multi-dimensional SPRT on a digitized surface in accordance with an embodiment of the present invention.

The process starts with generating a digitized reference surface (step 300). This digitized reference surface is generated using a RSM on the average values from a grid of temperature sensors on components, such as field replaceable units (FRUs) within a reference computer system. Note that the reference surface is static and can be used for normalizing the real-time digitized surface.

Next, a computer system running in real-time is tested (step 301). While this computer system is running, the system samples the temperature at selected points within the computer system (step 302).

After the samples are taken, the system creates a digitized real-time surface by interpolating the discrete points via the RSM (step 303).

Next, the system subtracts the reference surface from the real-time surface to produce a residual surface (step 304).

The system next runs a SPRT across both the x-dimension and the y-dimension of the residual surface (step 305). For example, for a location $X=X_1$, a SPRT is applied to the sequence of values in the y-direction $(X_1, Y_1), (X_1, Y_2), (X_1, Y_3), \ldots, (X_1, Y_n)$. Note that this process could possibly loop around from $Y_n$ to $Y_1$. The SPRT is also applied to the locations $X=X_2, X_3, \ldots, X_n$.

Similarly, in the x-direction, for a location $Y=Y_1$, a SPRT is applied to the sequence of values $(Y_1, X_1), (Y_1, X_2), (Y_1, X_3), \ldots, (Y_1, X_n)$, and could possibly loop around from $X_n$ to $X_1$. The SPRT is also applied similarly to locations $Y=Y_2, Y_3, \ldots, Y_n$. Thus, every grid point on the residual surface is evaluated by two separate SPRTs.

The system then determines if any of the SPRTs indicate an error condition. If a SPRT indicates an error condition, the system reports the condition. Next, after reporting the error condition, the system returns to step 301 and continues to execute normally. If there are no error conditions indicated by the SPRT at step 306, the system returns to step 301 and continues to execute normally.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for detecting anomalies in data gathered from sensors within a computer system, comprising:
    while the computer system is operating, sampling data from a sensors located at sampling points within the computer system;
    interpolating the data from the sampling points to produce a real-time digitized surface, wherein the real-time digitized surface includes at least an x-dimension, a y-dimension, and a z-dimension;
    subtracting a reference digitized surface from the real-time digitized surface to produce a residual digitized surface; and
    applying a multi-dimensional sequential probability ratio test (SPRT) to the residual digitized surface to detect anomalies in the residual digitized surface which indicate an impending failure of the computer system, wherein the SPRT is applied to at least three dimensions of the residual digitized surface.

2. The method of claim 1, wherein performing a multi-dimensional SPRT involves performing a SPRT in the x-direction and performing a SPRT in the y-direction.

3. The method of claim 2, wherein performing the multi-dimensional SPRT involves performing a SPRT in the x-direction, performing a SPRT in the y-direction, and performing a SPRT in the z-direction.

4. The method of claim 3, wherein performing the multi-dimensional SPRT in a specified direction involves performing the SPRT across parallel lines in the specified direction wherein the parallel lines are spaced at intervals across the digitized surface.

5. The method of claim 1, wherein if the multi-dimensional SPRT detects an anomaly, the system generates an alarm indicating that the computer system is likely to fail.

6. The method of claim 5, wherein generating the alarm involves identifying a location for the anomaly within the computer system.

7. The method of claim 1, wherein creating the reference digitized surface for the computer system involves sampling data from sensors within a reference computer system and generating an interpolated digitized surface from average values obtained from the sampled data.

8. The method of claim 1, wherein the sensors can measure parameters including, heat, vibration, noise, loads or any other numerical parameter within the computer system.

9. The method of claim 1, wherein interpolating the data from the sampling points involves using a response surface method (RSM) to interpolate the digitized surface between the discrete sampling points.

10. An apparatus for detecting anomalies in data gathered from sensors within a computer system, comprising:
    a processor;
    a sampling mechanism configured to sample computer system data from sensors in the computer system;

an execution mechanism running on the processor, wherein the execution mechanism is configured to, interpolate the data from the sampling mechanism to produce a real-time digitized surface, wherein the real-time digitized surface includes at least an x-dimension, a y-dimension, and a z-dimension, subtract a reference digitized surface from the real-time digitized surface to produce a residual digitized surface, and to apply a multi-dimensional SPRT to the residual digitized surface to detect anomalies in the residual digitized surface which indicate an impending failure of the computer system, wherein the SPRT is applied to at least three dimensions of the residual digitized surface.

11. The apparatus of claim 10, wherein while performing a multi-dimensional SPRT the execution mechanism is configured to perform a SPRT in the x-direction and perform a SPRT in the y-direction.

12. The apparatus of claim 11, wherein while performing a multi-dimensional SPRT the execution mechanism is configured to perform a SPRT in the x-direction, perform a SPRT in the y-direction, and perform a SPRT in the z-direction.

13. The apparatus of claim 12, wherein while performing the multi-dimensional SPRT in a specified direction execution mechanism is configured to perform the SPRT across parallel lines in the specified direction wherein the parallel lines are spaced at intervals across the digitized surface.

14. The apparatus of claim 10, wherein if the multi-dimensional SPRT detects an anomaly, the execution mechanism is configured to generate an alarm indicating that the computer system is likely to fail.

15. The apparatus of claim 14, wherein the execution mechanism is configured so that generating the alarm involves identifying a location for the anomaly within the computer system.

16. The apparatus of claim 10, wherein the apparatus is configured so that creating the reference digitized surface for the computer system involves sampling data from a sensors within a reference computer system and generating an interpolated digitized surface from average values obtained from the sampled data.

17. The apparatus of claim 10, wherein the sensors can measure parameters including, heat, vibration, noise, loads or any other numerical parameter within the computer system.

18. The apparatus of claim 10, wherein the apparatus is configured so that interpolating the data from the sampling points involves using a RSM to interpolate the digitized surface between the discrete sampling points.

19. A method for detecting anomalies in a set of data that forms a digitized surface, comprising:

obtaining the set of data that forms the digitized surface, wherein the digitized surface includes at least an x-dimension, a y-dimension, and a z-dimension; and applying a multi-dimensional SPRT to the digitized surface to detect anomalies in the digitized surface, wherein the SPRT is applied to at least three dimensions of the digitized surface.

20. The method of claim 19, wherein performing the multi-dimensional SPRT involves performing a SPRT in the x-direction and performing a SPRT in the y-direction.

21. The method of claim 20, wherein performing the multi-dimensional SPRT involves performing a SPRT in the x-direction, performing a SPRT in the y-direction and performing a SPRT in the z-direction.

22. The method of claim 21, wherein performing the multi-dimensional SPRT in a specified direction involves performing the SPRT across parallel lines in the specified direction wherein the parallel lines are spaced at intervals across the digitized surface.

23. The method of claim 19, wherein the method further comprises generating an alarm if the multi-dimensional SPRT detects an anomaly in the digitized surface.

24. The method of claim 23, wherein generating the alarm involves identifying a location for the anomaly within digitized surface.

25. A computer system that detects anomalies in data gathered from sensors within the computer system, comprising:

a processor;

a memory;

a sampling mechanism configured to sample data from sensors in the computer system;

an execution mechanism running on the processor, wherein the execution mechanism is configured to, interpolate the data from the sampling mechanism to produce a real-time digitized surface, wherein the real-time digitized surface includes at least an x-dimension, a y-dimension, and a z-dimension, subtract a reference digitized surface from the real-time digitized surface to produce a residual digitized surface, and to apply a multi-dimensional SPRT to the residual digitized surface to detect anomalies in the residual digitized surface which indicate an impending failure of the computer system, wherein the SPRT is applied to at least three dimensions of the residual digitized surface.

* * * * *